US008619652B2

(12) United States Patent
Singh et al.

(10) Patent No.: US 8,619,652 B2
(45) Date of Patent: Dec. 31, 2013

(54) SYSTEM AND METHOD FOR ADAPTIVE SLEEP OF WIRELESSLY NETWORKED DEVICES

(75) Inventors: Harkirat Singh, Santa Clara, CA (US);
Xiangping Qin, San Jose, CA (US);
Huai-Rong Shao, Santa Clara, CA (US);
Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1463 days.

(21) Appl. No.: 11/946,775

(22) Filed: Nov. 28, 2007

(65) Prior Publication Data
US 2008/0130543 A1   Jun. 5, 2008

Related U.S. Application Data

(60) Provisional application No. 60/872,936, filed on Dec. 4, 2006.

(51) Int. Cl.
*G08C 17/00* (2006.01)

(52) U.S. Cl.
USPC ............... 370/311; 455/343.3; 455/343.4; 340/7.33; 340/7.34; 340/7.35; 340/7.36

(58) Field of Classification Search
USPC .............................................. 370/311
See application file for complete search history.

(56) References Cited

U.S. PATENT DOCUMENTS

| 5,577,266 | A  | * | 11/1996 | Takahisa et al. ............. 455/3.06 |
| 5,606,725 | A  |   | 2/1997  | Hart |
| 5,991,279 | A  | * | 11/1999 | Haugli et al. ................ 370/311 |
| 6,212,398 | B1 | * | 4/2001  | Roberts et al. ............... 455/502 |
| 6,363,267 | B1 | * | 3/2002  | Lindskog et al. ............. 455/574 |
| 6,532,228 | B1 | * | 3/2003  | Burgess et al. .............. 370/349 |
| 6,774,926 | B1 |   | 8/2004  | Ellis et al. |
| 6,804,542 | B1 | * | 10/2004 | Haartsen ...................... 455/574 |
| 6,829,493 | B1 |   | 12/2004 | Hunzinger |
| 6,871,078 | B2 |   | 3/2005  | Nishioka et al. |

(Continued)

FOREIGN PATENT DOCUMENTS

| EP | 1473870      | 3/2004  |
| EP | 1597895 A2   | 11/2005 |

(Continued)

OTHER PUBLICATIONS

Caetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf ], pp. 1-6.

(Continued)

*Primary Examiner* — Ian N Moore
*Assistant Examiner* — Dung B Huynh
(74) *Attorney, Agent, or Firm* — Kenneth L. Sherman, Esq.; Michael Zarrabian, Esq.; Sherman & Zarrabian LLP (57) ABSTRACT

A system and method for power saving in a wireless network for transmitting uncompressed audio/video (A/V) data disclosed. The method includes an adaptive sleep period scheme in which the current sleep period is computed based at least partly on one or more previous sleep periods. The method also includes entering an inactive state by a coordinator as well as non-coordinator stations in the wireless network in which no beacons are transmitted.

33 Claims, 7 Drawing Sheets

(56) References Cited

U.S. PATENT DOCUMENTS

| | | | |
|---|---|---|---|
| 6,963,764 B2* | 11/2005 | Jamieson et al. | 455/574 |
| 6,981,045 B1 | 12/2005 | Brooks | |
| 7,027,460 B2 | 4/2006 | Iyer et al. | |
| 7,061,879 B2* | 6/2006 | Oprescu-Surcobe et al. | 370/311 |
| 7,277,417 B2* | 10/2007 | Palm et al. | 370/338 |
| 7,337,337 B2 | 2/2008 | Hong | |
| 7,349,355 B2* | 3/2008 | Sengupta et al. | 370/311 |
| 7,394,782 B2* | 7/2008 | Davis | 370/324 |
| 7,412,265 B2 | 8/2008 | Chen et al. | |
| 7,483,717 B2* | 1/2009 | Champion et al. | 455/557 |
| 7,529,289 B2 | 5/2009 | Currivan et al. | |
| 7,606,182 B2 | 10/2009 | Park et al. | |
| 7,761,900 B2 | 7/2010 | Crayford | |
| 2002/0034959 A1 | 3/2002 | Jamieson et al. | 455/517 |
| 2002/0082060 A1* | 6/2002 | Kang et al. | 455/574 |
| 2002/0152307 A1 | 10/2002 | Doyle et al. | |
| 2003/0036354 A1* | 2/2003 | Lee et al. | 455/41 |
| 2003/0055971 A1 | 3/2003 | Menon | |
| 2003/0114898 A1* | 6/2003 | Von Arx et al. | 607/60 |
| 2003/0128111 A1* | 7/2003 | Sano et al. | 340/459 |
| 2004/0072573 A1 | 4/2004 | Shvodian | |
| 2004/0077383 A1* | 4/2004 | Lappetelainen et al. | 455/574 |
| 2004/0184475 A1* | 9/2004 | Meier | 370/449 |
| 2004/0217948 A1* | 11/2004 | Kawasaki et al. | 345/204 |
| 2004/0218556 A1* | 11/2004 | Son et al. | 370/311 |
| 2004/0253996 A1 | 12/2004 | Chen et al. | |
| 2004/0264397 A1* | 12/2004 | Benveniste | 370/311 |
| 2005/0009578 A1 | 1/2005 | Liu | |
| 2005/0014464 A1 | 1/2005 | Larsson | |
| 2005/0018624 A1* | 1/2005 | Meier et al. | 370/318 |
| 2005/0070340 A1* | 3/2005 | Kim | 455/574 |
| 2005/0122926 A1* | 6/2005 | Cromer et al. | 370/311 |
| 2005/0169201 A1* | 8/2005 | Huylebroeck | 370/311 |
| 2005/0221869 A1* | 10/2005 | Liu et al. | 455/574 |
| 2005/0233789 A1 | 10/2005 | Maekawa | |
| 2005/0249137 A1* | 11/2005 | Todd et al. | 370/311 |
| 2006/0014557 A1 | 1/2006 | Rajkotia et al. | |
| 2006/0095638 A1* | 5/2006 | Unger | 710/310 |
| 2006/0129855 A1 | 6/2006 | Rhoten et al. | |
| 2006/0246869 A1* | 11/2006 | Ohlenbusch et al. | 455/343.2 |
| 2006/0270438 A1 | 11/2006 | Choi et al. | |
| 2007/0038346 A1* | 2/2007 | Ehrlich et al. | 701/33 |
| 2007/0060152 A1 | 3/2007 | Sakamoto et al. | |
| 2007/0105548 A1* | 5/2007 | Mohan et al. | 455/426.1 |
| 2007/0109987 A1* | 5/2007 | Kohlmann et al. | 370/318 |
| 2007/0211745 A1* | 9/2007 | Deshpande et al. | 370/432 |
| 2007/0237122 A1 | 10/2007 | Liu et al. | |
| 2007/0274244 A1* | 11/2007 | Yoon et al. | 370/311 |
| 2007/0297438 A1 | 12/2007 | Meylan et al. | |
| 2008/0130540 A1 | 6/2008 | Singh et al. | |
| 2008/0134271 A1 | 6/2008 | Qin et al. | |
| 2008/0219200 A1* | 9/2008 | Kohlmann et al. | 370/311 |
| 2008/0259836 A1* | 10/2008 | Beach | 370/311 |
| 2009/0005127 A1* | 1/2009 | Frenger et al. | 455/574 |
| 2009/0279464 A1 | 11/2009 | Kakani et al. | |
| 2011/0188430 A1* | 8/2011 | Ohlenbusch et al. | 370/311 |
| 2012/0195245 A1* | 8/2012 | Frenger et al. | 370/311 |

FOREIGN PATENT DOCUMENTS

| | | |
|---|---|---|
| JP | 2004320769 A | 11/2004 |
| KR | 1020060057515 A | 6/2008 |
| WO | WO 2006/083559 A1 | 9/2005 |
| WO | WO 2006/101801 | 9/2006 |

OTHER PUBLICATIONS

U.S. Office Action dated Jun. 24, 2010 in U.S. Appl. No. 11/868,364, filed Oct. 5, 2007.
U.S. Office Action dated Jun. 28, 2010 in U.S. Appl. No. 11/947,694, filed Nov. 29, 2007.
FreshNews.com, SiBEAM Receives Equity Investment from Best Buy, http://freshnews.com/print/node/261440, Jan. 4, 2010, 2 pages.
Hachman, "CE Giants back Amimon's Wireless HDTV Tech," online: www.pcmag.com, 1 page, Jul. 23, 2008.
Jun et al., Affinity-based Power Saving MAC Protocol in Ad Hoc Networks, IEEE 3rd Proceedings of the Int'l Conference on Pervasive Computing and Communication: IEEE PerCom 2005, pp. 363-372.
LG Electronics Inc., WirelessHD Specification Version 1.0 Overview, Oct. 9, 2007, 77 pages.
NEC develops compact millimeter-wave transceiver for uncompressed HDTV signal transmission, NE Asia Online, Apr. 5, 2005, (Downloaded from http://neasia.nikkeibp.com/topstory/000913 on Sep. 29, 2006.).
International Preliminary Report on Patentability and Written Opinion dated Jun. 10, 2009 for PCT/KR2007/006227, filed Dec. 4, 2007.
International Search Report dated Mar. 14, 2008 for PCT/KR2007/006222, filed Dec. 4, 2007.
International Preliminary Report on Patentability and Written Opinion dated Jun. 10, 2009 for PCT/KR2007/006222, filed Dec. 4, 2007.
International Search Report dated Mar. 11, 2008 for PCT/KR2007/006223, filed Dec. 4, 2007.
International Preliminary Report on Patentability and Written Opinion dated Jun. 10, 2009 for PCT/KR2007/006223, filed Dec. 4, 2007.
Dong Geun Jeong et al. Performance of Adaptive Sleep Period Control for Wireless Communications Systems. IEEE Transactions on Wireless Communications, vol. 5, No. 11, Nov. 2006, pp. 3012-3016.
International Search Report and Written Opinion for PCT/KR2007/006227 dated Mar. 17, 2008.
IEEE Std 802.15.3, "Wireless Medium Access Control (MAC) and Physical Layer (PHY) Specifications for High Rate Wireless Personal Areas Networks (WPANs)", 2003.
IEEE Wireless LAN Edition (2003), "A compilation based on IEEE Std 802.11TM—1999 (R2003) and its amendments."
Korean Office Action dated Sep. 30, 2009 issued in Korean Patent Application No. 10-2007-0125179, Korean Intellectual Property Office, pp. 1-7, Seo-gu, Daejeon, Republic of Korea (Machine-generated English-language translation attached, pp. 1-3).
Korean Office Action dated Dec. 31, 2009 issued in Korean Patent Application No. 10-2007-0125179, Korean Intellectual Property Office, pp. 1-3, Seo-gu, Daejeon, Republic of Korea (Machine-generated English-language translation attached, p. 1).
Korean Office Action dated Sep. 28, 2009 issued in Korean Patent Application No. 10-2007-0125180, Korean Intellectual Property Office, pp. 1-6, Seo-gu, Daejeon, Republic of Korea (Machine-generated English-language translation attached, pp. 1-3).
Korean Office Action dated Dec. 30, 2009 issued in Korean Patent Application No. 10-2007-0125180, Korean Intellectual Property Office, pp. 1-3, Seo-gu, Daejeon, Republic of Korea (Machine-generated English-language translation attached, p. 1).
U.S. Final Office Action for U.S. Appl. No. 11/947,694 mailed Dec. 2, 2010.
U.S. Non-Final Office Action for U.S. Appl. No. 11/947,694 mailed Jan. 6, 2012.
U.S. Non-Final Office Action for U.S. Appl. No. 11/947,694 mailed Apr. 9, 2013.
U.S. Final Office Action for U.S. Appl. No. 11/947,694 mailed May 23, 2012.

* cited by examiner

| IE index | IE name |
|---|---|
| 0x00 | MAC address |
| 0x01 | Schedule |
| 0x02 | RATB allocation |
| 0x03 | MAC capability |
| 0x04 | PHY capability |
| 0x05 | Scan |
| 0x06 | Coordinator handover |
| 0x07 | Next coordinator |
| 0x08 | Station association |
| 0x09 | WVAN parameter change |
| 0x0A | WVAN shutdown |
| 0x0B | PM mode |
| 0x0C | PM wake |
| 0x0D | TPC report |
| 0x0E | WVAN name |
| 0x0F | Channel location |

Informational elements

FIG. 4A

| Octets: 1 | 1 | 8 |
|---|---|---|
| IE index | Length | Sleep station bitmap |

PM mode informational element

FIG. 4B

| Octets: 1 | 1 | 1 | ... | 1 |
|---|---|---|---|---|
| IE index | Length | STID Wake 1 | ... | STID Wake n |

PM wake informational element

SYSTEM AND METHOD FOR ADAPTIVE SLEEP OF WIRELESSLY NETWORKED DEVICES

CROSS-REFERENCE TO RELATED APPLICATIONS

This application claims the benefit under 35 U.S.C. 119(e) of U.S. Provisional Application No. 60/872,936, filed on Dec. 4, 2006, which is incorporated by reference in its entirety.

BACKGROUND OF THE INVENTION

1. Field of the Invention

The present invention relates to wireless transmission of video information, and in particular, to adaptive sleep and deep sleep mode for wirelessly networked devices.

2. Description of the Related Technology

With the proliferation of high quality video, an increasing number of electronic devices, such as consumer electronic devices, utilize high definition (HD) video which can require multiple gigabit per second (Gbps) or more in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless personal area network (WPAN) and similar technologies can suffer from throughput not high enough to support HD AV applications.

SUMMARY OF CERTAIN INVENTIVE ASPECTS

The apparatus, method, and devices of the invention each have several aspects, no single one of which is solely responsible for its desirable attributes. Without limiting the scope of this invention as expressed by the claims which follow, its more prominent features will now be discussed briefly.

In one embodiment, there is a method of power saving in a wireless network for transmitting uncompressed audio/video (A/V) data, the method comprising detecting a low or no channel activity in the wireless network by a station, entering into a deep sleep mode by the station, wherein the deep sleep mode includes one or more periods of inactive state during which the station does not transmit a beacon, computing a current sleep period for a current sleep window cycle based at least partly on one or more previous sleep periods by the station, and remaining in the deep sleep mode by the station for the duration of the computed current sleep period or until a new channel activity is detected in the wireless network.

In another embodiment, there is a method of power saving in a wireless network for transmitting uncompressed audio/video (A/V) data having a coordinator station, the method comprising detecting a low or no channel activity in the wireless network by the coordinator station; and entering into a deep sleep mode status for a new sleep window, wherein the deep sleep mode includes a power-saving inactive state during which the coordinator station does not transmit a beacon.

In another embodiment, there is an apparatus for power saving in a wireless network for transmitting uncompressed audio/video (A/V) data, the apparatus comprising a processor configured to cause the station to enter into a deep sleep mode when a low or no channel activity is detected within a preset duration, wherein the deep sleep mode includes one or more periods of inactive state during which the station does not transmit a beacon, and compute a current sleep period for a current sleep window cycle using an adaptive sleep period algorithm based at least partly on one or more previous sleep periods; and a memory in communication with the processor and configured to store the computed current sleep period.

In another embodiment, there is an apparatus for power saving in a wireless network for transmitting uncompressed audio/video (A/V) data, the apparatus comprising a processor configured to compute a current sleep period, and cause a coordinator station to enter into a deep sleep mode status for the duration of the current sleep period, wherein the deep sleep mode includes a power-saving inactive state during which the coordinator station does not transmit a beacon; and a memory in data communication with the processor and configured to store the current sleep period.

In another embodiment, there is an apparatus for power saving in a wireless network for transmitting uncompressed audio/video (A/V) data, the apparatus comprising means for detecting a low or no channel activity in the wireless network; means for computing a current sleep period based at least partly on one or more previous sleep periods; and means for entering a deep sleep mode, wherein the deep sleep mode includes one or more periods of inactive state during which the station does not transmit a beacon.

DETAILED DESCRIPTION OF CERTAIN INVENTIVE EMBODIMENTS

Certain embodiments provide a method and apparatus of deep-sleep power saving (DSPS) for wireless communication devices in a wireless network for transmitting uncompressed audio/video (A/V) data.

The following detailed description is directed to certain sample embodiments of the invention. However, the invention can be embodied in a multitude of different ways as defined and covered by the claims. In this description, reference is made to the drawings wherein like parts are designated with like numerals throughout.

Embodiments include systems and methods of power-saving for wireless communication devices for communication of uncompressed video data will be described. Video data may include one or more of motion video, still images, or any other suitable type of visual data. In particular, various embodiments representing deep-sleep power saving schemes for stations in wireless video area network (WVAN) including a coordinator will be described.

A standby mode of consumer electronics devices can consume significant amount of power. Therefore, to enhance power savings, it would be desirable that all devices in a wireless video area network (WVAN) including the coordinator to conserve power, especially when the devices are not being used for an extended period of time, e.g., during night time when the users sleep or when the users are away on a vacation. In some embodiments of the deep-sleep mode described below, all devices including the coordinator go to sleep. Other embodiments of the deep-sleep mode use adaptive sleep period algorithm likewise described below.

Figure 1:
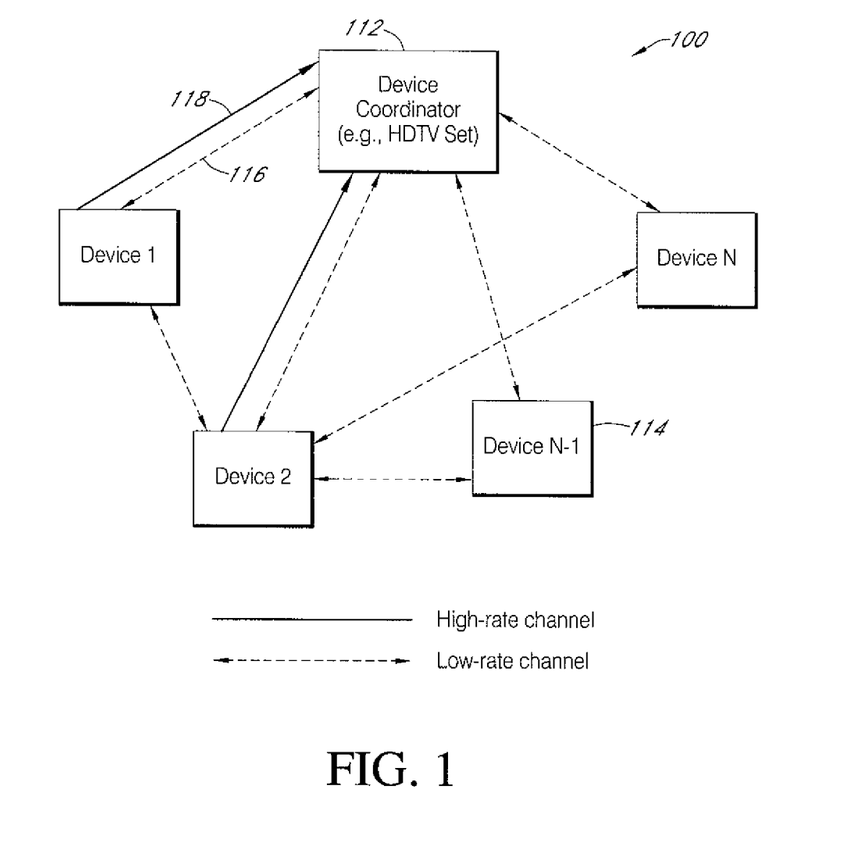
FIG. 1 is a functional block diagram of an exemplary configuration of a wireless local area network (WLAN) that implements uncompressed HD video transmission between wireless devices according to one embodiment of the apparatus and method.

Exemplary implementations of the embodiments in a wireless high definition (HD) audio/video (A/V) apparatus will now be described. FIG. 1 shows a functional block diagram of a wireless local area network (WLAN) 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple client devices or A/V stations 114 (e.g., Device 1 . . . Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-Gb/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (referred to as "receiver 112"), and the station 114 is a sender of the video information (referred to as "sender 114"). For example, the receiver 112 can be a sink of video and/or audio data implemented, such as, in an HDTV set in a home wireless network environment which is a type of WVAN. The sender 114 can be a source of uncompressed video or audio. Examples of the sender 114 include a set-top box, a DVD player or recorder, a digital camera, a camcorder, and so forth. A wireless personal area network (WPAN) is a wireless network used for wireless data communication among computing devices closed to one person. The reach of the WPAN is typically a few meters. Other than the limited range, the discussion given above for the WLAN applies to WPAN as well. A wireless video area network (WVAN) is a subset of the WPAN in which the data being communicated includes video data.

Figure 2:
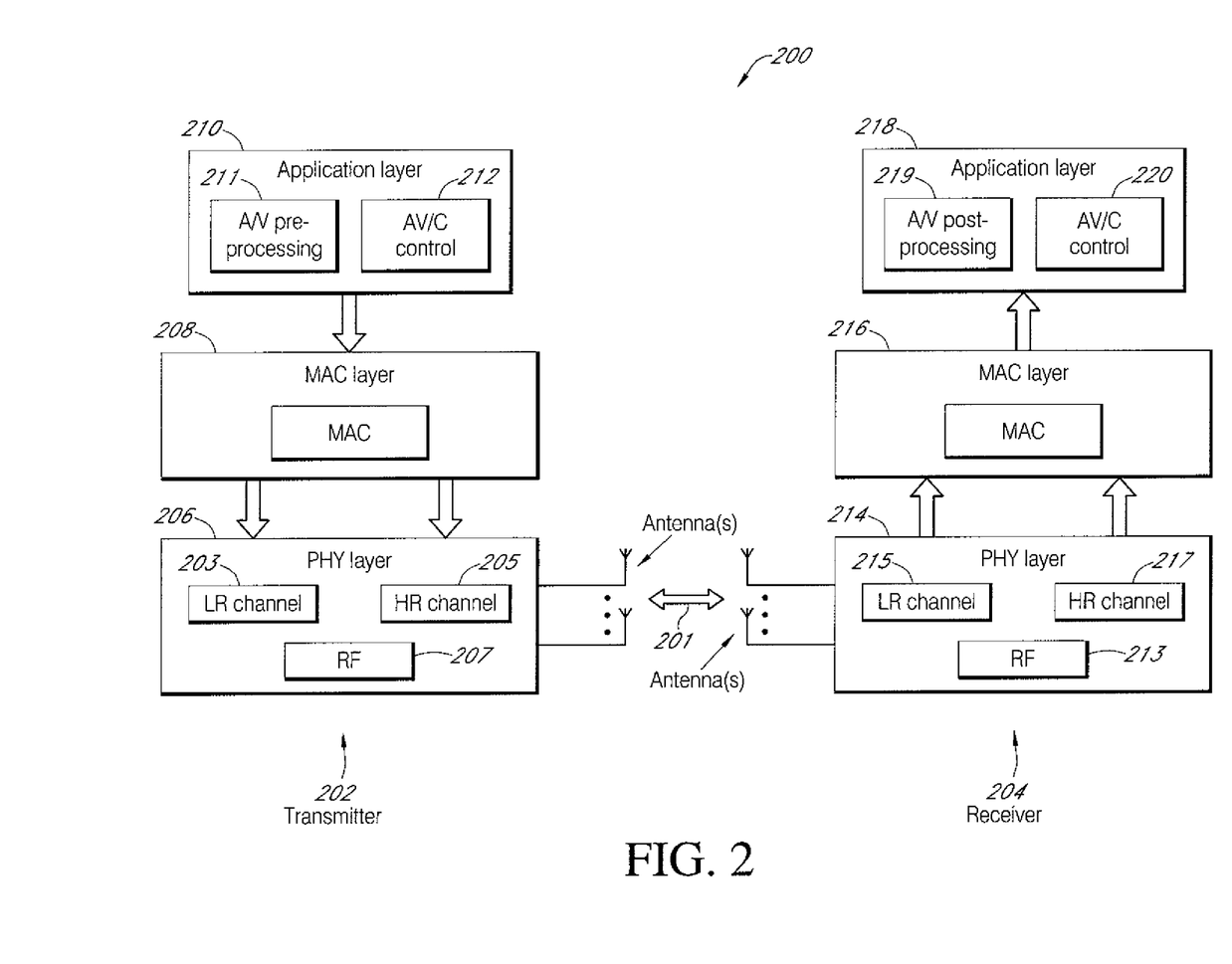
FIG. 2 is a functional block diagram of an example communication apparatus for transmission of uncompressed HD video over a wireless medium, according to one embodiment of the apparatus and method.

FIG. 2 illustrates a functional block diagram of an example communication apparatus 200. The apparatus 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216 process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202. In certain embodiments, one or both of the MAC layers 208 and 216 may include a block (not shown) for power saving which implements modules related to a deep sleep power saving mode described in detail below.

Figure 3:
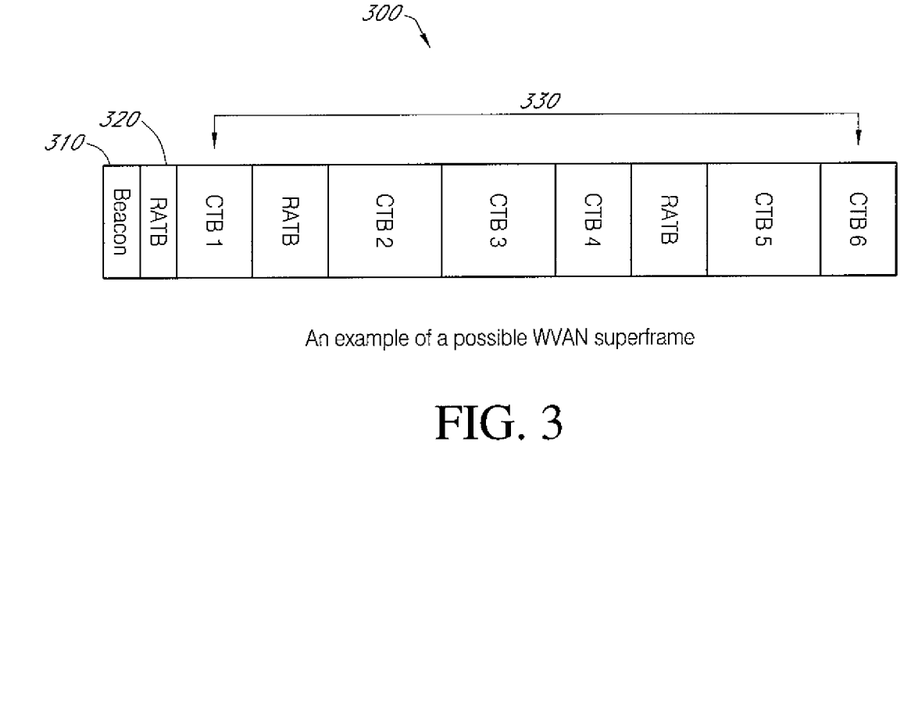
FIG. 3 is a diagram of an example superframe that can be used in a WVAN such as illustrated in FIG. 1.

A WVAN begins when a coordinator-capable station takes on the responsibility of being the coordinator 112, such as shown in FIG. 1. A coordinator 112 communicates with various stations 114 by transmitting and receiving superframes. FIG. 3 shows a possible superframe 300 that may be used in a WVAN. The superframe 300 includes a beacon 310, a Random Access Time Block (RATB) field 320, and channel time blocks (CTBs) 330. The beacon frame 310 includes information elements that are used to carry various control messages. Information elements relating to certain embodiments are described below. The CTBs 330 are used to carry the data, e.g., uncompressed video data, being communicated between a coordinator and a station and between stations. The CTBs may be either reserved or unreserved. In certain embodiments, the RATB 320 is a special unreserved CTB which comes immediately after the beacon frame in each superframe. The RATB 320 is used for devices to send urgent control/management commands through contention.

Figure 4A:
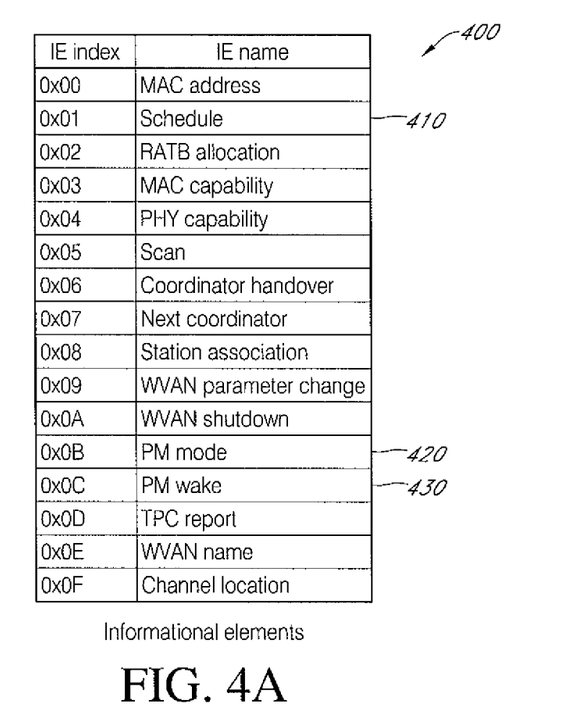
FIG. 4A is a diagram showing various examples of information elements that can be present in a superframe such as shown in FIG. 3.
Figure 4B:
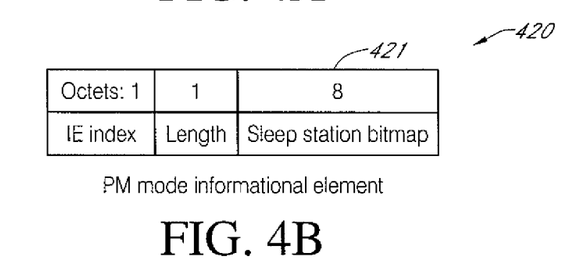
FIG. 4B is a diagram showing various fields of a Power Management (PM) mode informational element (IE) such as shown in FIG. 4A.
Figure 4C:
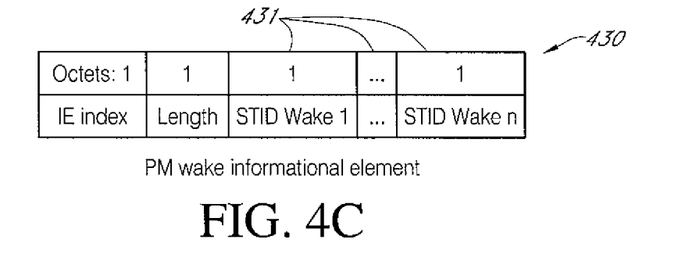
FIG. 4C is a diagram showing various fields of a PM wake IE such as shown in FIG. 4A.

The coordinator 112 may use some informational elements (IEs), such as listed in a table 400 shown in FIG. 4A, to inform the stations or devices 114. Some IEs are typically sent in every beacon, such as the Schedule IE 410, while others are only sent if certain operations are in use, such as the Power Management (PM) mode IE 420 which is sent only if the WVAN is in a SLEEP mode. Other IEs are only sent as an indication of a change in the condition of the WVAN. These IEs are called announcements, an example of which is the PM wake IE 430. FIG. 4B shows an example of the PM mode IE 420, which includes a Sleep station bitmap field 421 while FIG. 4C shows an example of the PM wake mode IE 430 which includes Station Identifier (STID) wake fields 431. The PM mode IE and the PM wake IE will be discussed further in reference to FIG. 6 below.

Power management (PM) refers to various protocols that are implemented to effectuate power savings for wireless devices within a WVAN. The provision of special information elements such as PM wake mode IE and PM wake IE, for example, falls within the PM framework. A station that is a member of the WVAN is in one of two PM modes: AWAKE mode and SLEEP mode. In the AWAKE mode, the station is participating in every superframe, including sending and listening to beacons. In the SLEEP mode, on the other hand, the station is not sending but only listening to some or all of beacons. When a station is in either of the PM modes, it will be in one of two states, either active or inactive state. When a station is in the active state, it is transmitting, receiving or preparing to transmit or receive. In inactive state, the station has some or all portions of its radio turned off to save power. In a conventional SLEEP mode, also known as a "short sleep mode," while some or all stations 114 may go into the power-saving SLEEP mode, the coordinator 112 remains in the AWAKE mode to monitor channel activities and to perform other duties associated with being a coordinator.

I. Deep Sleep Power Saving (DSPS)

Figure 5:
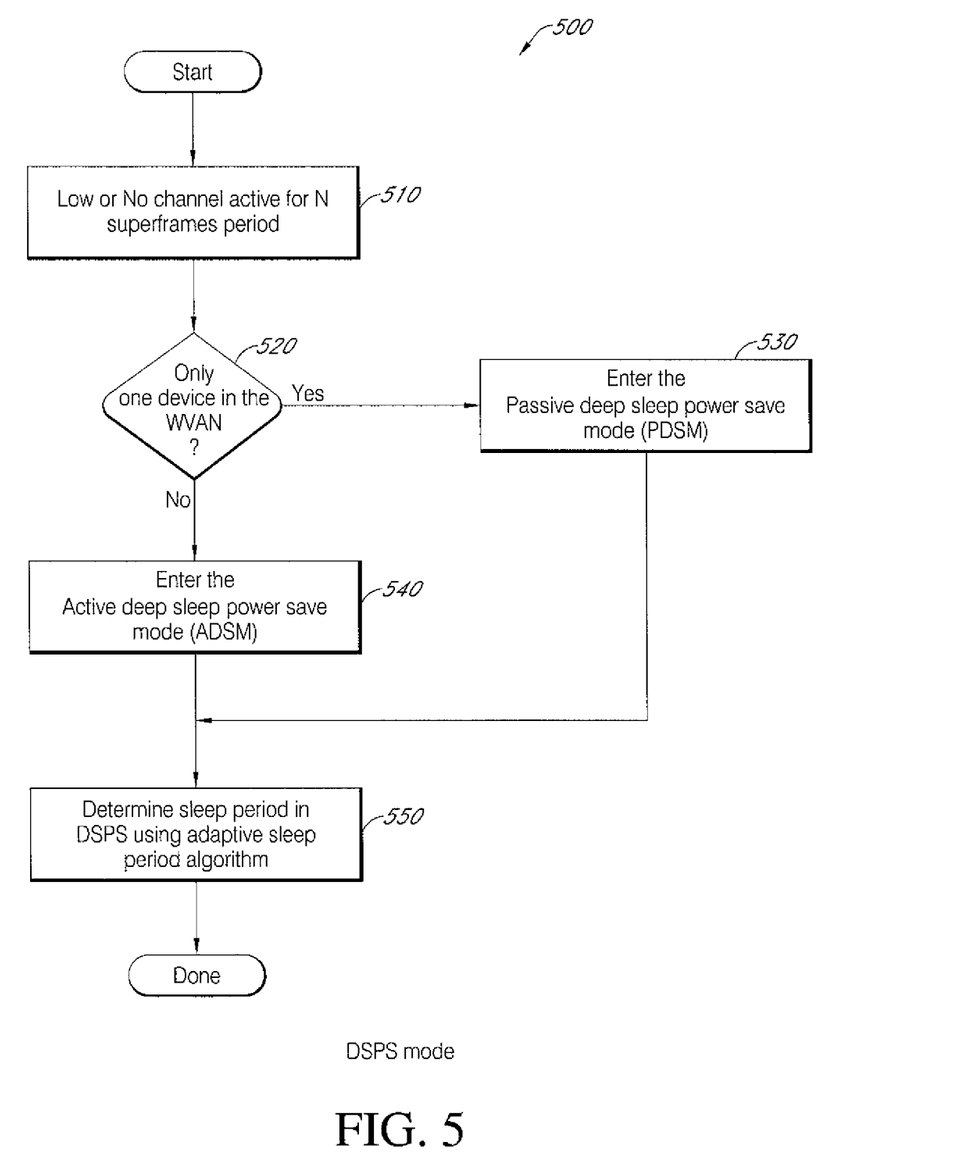
FIG. 5 is a flowchart of an embodiment of a deep sleep power saving (DSPS) mode.

By contrast, in a deep sleep power saving mode (DSPS) to be described in detail below, the coordinator 112 as well as non-coordinator stations can go into the power-saving SLEEP mode. FIG. 5 illustrates a schematic flowchart illustrating a deep sleep power saving (DSPS) process 500 according to certain embodiments. The process 500 starts at state 510, where a coordinator in a WVAN detects a low or no channel activity for a fixed number (N) of superframes. At state 520, the coordinator queries whether it is the only device or station in the WVAN or there is another device or station—a non-coordinator—in the WVAN. If the coordinator is the only device in the WVAN, the process enters a passive DSPS mode (PDSM) at state 530. On the other hand, if there is a non-coordinator in the WVAN, the process enters an active DSPS mode (ADSM) at state 540. Both the PDSM and the ADSM will be described in detail below. Under either the PDSM or the ADSM, the process 500 moves to state 550, where the coordinator determines a sleep period in DSPS using an adaptive sleep period algorithm, which is likewise described below.

II. Adaptive Sleep Period Algorithm

As discussed above, under either the PDSM 530 or the ADSM 540, the coordinator determines the sleep period using the adaptive sleep period algorithm (state 550, FIG. 5).

In one embodiment of the deep sleep power saving (DSPS) mode, the following formula defines the sleep period for the $k^{ith}$ sleep window ($SW_k$):

$$SW_K = \begin{cases} \text{initial-deep-sleep-window}, & k = 0 \\ \min\{s^* SW_{K-1}, \text{final-deep-sleep-window}\} & k > 0 \end{cases}$$

In the embodiment employing this formula, the initial sleep period ($SW_0$) is equal to a preset initial-deep-sleep-window value. If the station re-enters the DSPS mode, the new sleep period, $SW_1$, is set to $s^*SW_0$. In general, a current sleep period, $SW_k$, is set to $s^*SW_{k-1}$, where s is a multiplicative factor and $SW_{k-1}$ is the sleep period computed for the previous sleep window. In one particular embodiment, the multiplicative factor, s, is set to 2. This procedure for computing the current sleep period is repeated as long as the resulting sleep period does not exceed a preset final-deep-sleep window value. If the computed current sleep period exceeds the final deep-sleep-window value, the current sleep period is set equal to the final-deep-sleep-window value. Therefore, the final-deep-sleep-window value represents the maximum allowed sleep period in a sleep window. While this particular embodiment of the adaptive sleep period algorithm uses one sleep period from the previous sleep window cycle, other embodiments of the algorithm may use multiple previous sleep periods covering multiple previous sleep window cycles. In certain embodiments, the function can involve addition, subtraction, multiplication, division, and the like mathematical operations on the one or more previous sleep periods and can also involve one or more constant multiplicative or additive factors.

III. Deep Sleep Mode Operation

As discussed above in reference to FIG. 5, according to one embodiment, there are two sub-modes of the deep sleep power saving (DSPS) mode: the passive DSPS mode (PDSM) and the active DSPS (ADSM).

a. Passive Deep Sleep Mode (PDSM)

In some embodiments, a station acquiring the role of the coordinator and detecting no channel activity by means of association requests and/or other control messages for N superframes period relinquishes the role of the coordinator by not sending beacons. The station then enters the PDSM, wherein the station computes the sleep period as per the adaptive sleep period algorithm described in Section II above and also schedules system wake periods during which the station periodically wakes up from an inactive state and stays in an active state for a number of superframe cycles. During each of the scheduled wake periods, the station passively scans the channel for at least K number of superframes for a new channel activity. In one embodiment, K is set to two. The station terminates the PDSM when some channel activity is detected or some higher layer request is pending. Otherwise, the station relapses into the inactive state until the next system wake period or until the current sleep window expires.

b. Active Deep Sleep Mode (ADSM)

Figure 6:
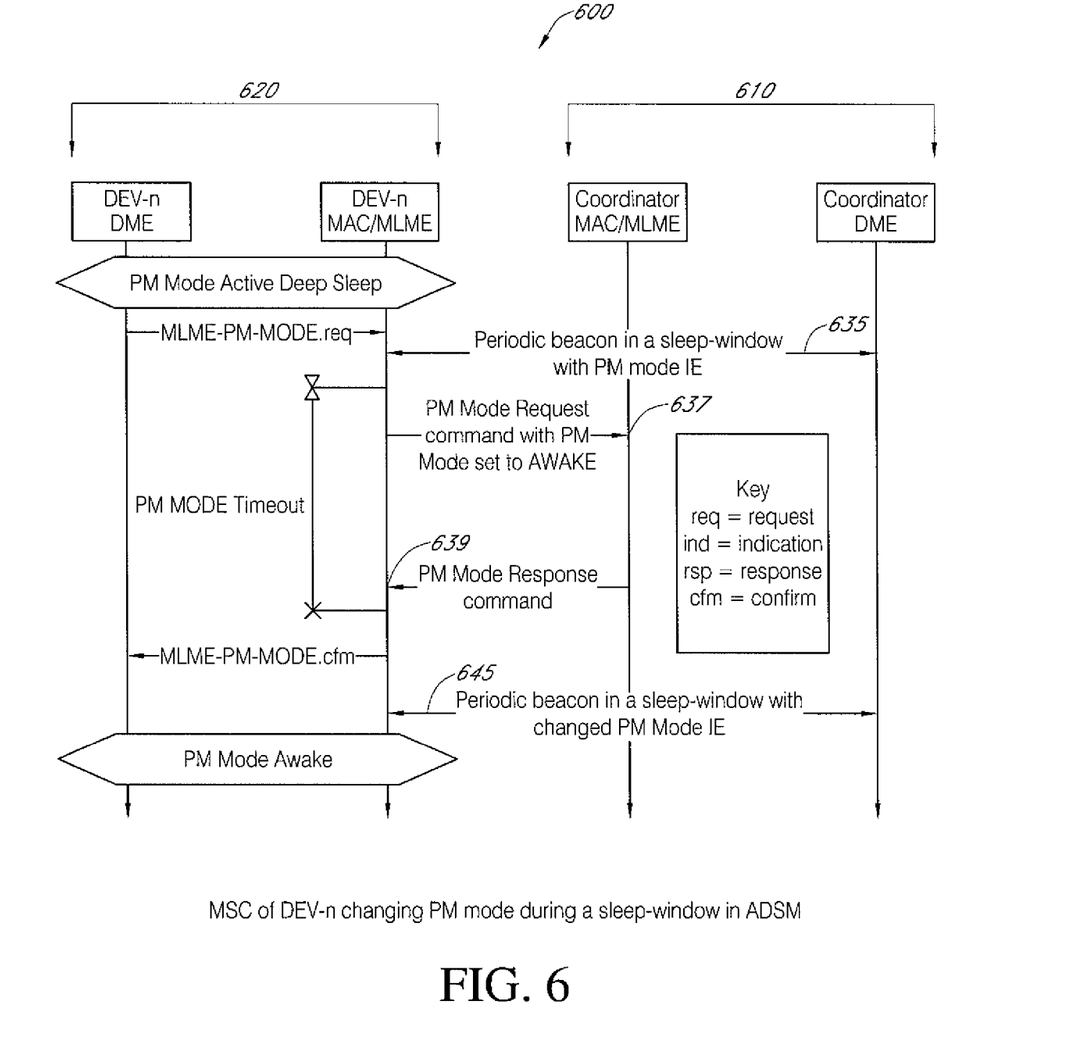
FIG. 6 is a schematic message sequence chart (MSC) of an embodiment of an active deep sleep mode (ADSM).

In some embodiments, a fully functional WVAN, comprising of multiple stations including one station performing the role of a coordinator, enters the active deep sleep mode (ADSM) upon detecting no channel activity for N superframes period. During the ADSM, the sleep period for the current sleep window cycle is computed as per the adaptive sleep period algorithm described in Section I above. Also, as with the PDSM, periodic system wake periods are scheduled. FIG. 6 shows a schematic message sequence chart 600 illustrating a station (DEV-n) 620 changing its PM mode from SLEEP to AWAKE during an ADSM according to one embodiment. During ADSM, all stations including a coordinator 610 sleep during which the stations are at least partly in the power-saving inactive state. During the ADSM, the coordinator 610 announces the ADSM to all stations in the WVAN by wirelessly transmitting deep-sleep-mode messages indicating the deep sleep mode status to other stations in the WVAN. The deep-sleep-mode messages comprise beacons 635 having the PM mode IE 420 set to ADSM and all stations in the ADSM indicated in the Sleep station bitmap field 421 (shown in FIG. 4B).

Figure 7:
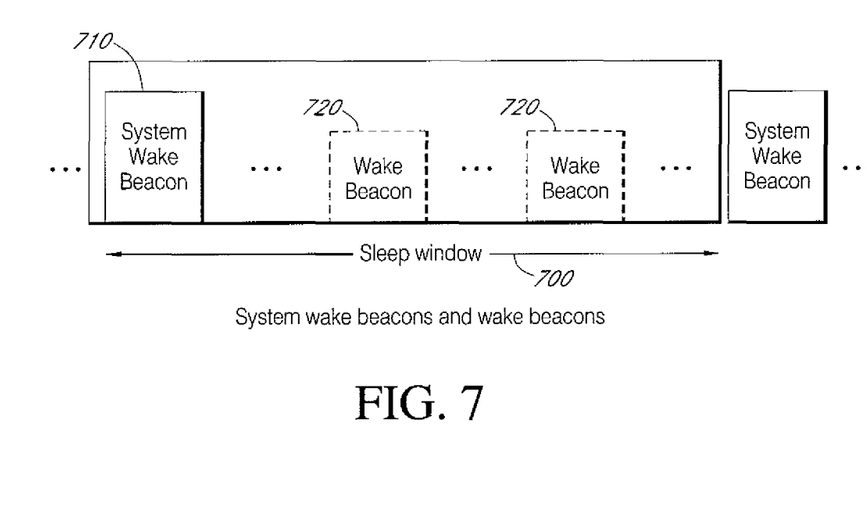
FIG. 7 is a diagram showing system wake beacons and wake beacons according to certain embodiments.

While a station is in the ADSM, it is not required to be in an active state for every beacon. Instead, the station may skip beacons to save power. The number of beacons that the station skips is based on its application requirement for latency. FIG. 7 is a block diagram of an example of a system wake beacon 710 and a plurality of wake beacons 720 that can be issued by a coordinator within a sleep window 700 according to certain embodiments. In one embodiment, the coordinator 610 can schedule wake periods to avoid large latency in response messages as described below. After waking up from an inactive state during which no system wake beacon is sent out, the coordinator goes into an active state during a new wake superframe at the beginning of which it sends a wake beacon 720 that includes the PM wake IE 430 (FIG. 4C) with one or more STID Wake bits 431 set high, the remaining duration of the current sleep-window, and the time when the next wake beacon will be transmitted. After sending the wake beacon 720, the coordinator remains in an active state during the wake superframe. However, the station is not required to be in the active state during the wake superframe. The maximum duration between two consecutive periodic wake beacons in a sleep-window is mMaxPeriodicWakePeriod.

At the end of a sleep-window, the coordinator 610 sends out the system wake beacon 710 (FIG. 7) marking the beginning of a system wake period, which may last one or more superframes. A station 620 in the ADSM on its part listens to all system wake beacons 710, as announced by the coordinator 610, and is in the active state during the system wake superframe. At the end of the system wake period, which may last one or more system wake superframes, the coordinator and non-coordinator stations relapse into the inactive state during which no system wake beacon is sent, unless a request is made by a station to terminate the SLEEP mode as described below.

The station 620 in the ADSM may return to AWAKE mode after detecting, for example, a channel activity, by sending a PM Request command 637 to the coordinator with the PM Mode field set to "AWAKE." The station then considers itself in AWAKE mode as soon as it attempts to send the command. The coordinator 616 responds to a correctly received PM Request command 637 with the PM response command 639. The coordinator may refuse the request of the station to enter AWAKE mode if the coordinator is in the process of handing over control of the WVAN. Otherwise, the coordinator grants the request. Upon receiving some channels activity such as PM mode change request 637 or other messages, the coordinator terminates the ADSM by including a changed PM mode IE in the beacon 645 transmitted immediately at the end of the superframe, as illustrated in FIG. 6. All other stations in the active deep sleep mode notice the termination of ADSM at the time the scheduled system wake beacon is transmitted. The coordinator can change the next periodic wake duration at any time. A new device soliciting to join an existing WVAN scans for a beacon for at least mMaxPeriodicWakePeriod before assuming that there is no WVAN existing and deciding to start its own WVAN. In general, the coordinator sends out the follow-up beacon 645 at the end of the system wake superframe which indicates either the termination of the ADSM state or the next sleep window duration. If a station in the ADSM does not correctly receive the system wake beacon, it shall remain in the active state until a beacon is correctly received.

The above-described method of deep-sleep power saving process may be realized in a program format to be stored on a computer readable recording medium that includes any kinds of recording devices for storing computer readable data, for example, a CD-ROM, a DVD, a magnetic tape, a memory (e.g., capable of storing firmware), memory card and a disk, and may also be realized in a carrier wave format (e.g., Internet transmission or Bluetooth transmission.) In some embodiments, the coordinator 112 or the non-coordinator station 114 shown in FIG. 1 includes the computer readable recording medium and can also include a processor, controller, or other computing device and a memory.

CONCLUSION

While the above detailed description has shown, described, and pointed out the fundamental novel features of the invention as applied to various embodiments, it will be understood that various omissions and substitutions and changes in the form and details of the apparatus illustrated may be made by those skilled in the art, without departing from the intent of the invention.

What is claimed is:

1. A method of power saving in a wireless network for transmitting uncompressed audio/video (A/V) data, the method comprising:
   detecting a low or no channel activity in the wireless network by a station;
   entering into a deep sleep power saving (DSPS) mode by the station, wherein the DSPS mode includes one or more periods of inactive state during which the station does not transmit a beacon, wherein the DSPS mode includes a first sub-mode and a second sub-mode, wherein the first sub-mode comprising a passive DSPS mode (PDSM) and the second sub-mode comprising an active DSPS mode (ADSM);
   adaptively computing a current sleep period for a current sleep window cycle based at least on a maximum allowed sleep period and one or more previous sleep periods by the station; and
   remaining in the deep sleep mode by the station for the duration of the computed current sleep period or until a new channel activity is detected in the wireless network, wherein the PDSM comprising:
      passively scanning for channel activity for K superframes during a scheduled wake period, wherein the station terminates the PDSM when channel activity is detected, otherwise the station returns to an inactive state, where K comprises an integer; and
   the ADSM comprising:
      announcing the ADSM to all stations in the wireless network by transmitting DSPS messages indicating DSPS status.

2. The method of claim 1, wherein the current sleep period is different from the one or more previous sleep periods.

3. The method of claim 1, wherein the computing the current sleep period using an adaptive sleep period algorithm comprises finding a minimum of:

a mathematical function operating on at least one previous sleep period; and the maximum allowed sleep period.

4. The method of claim 1, wherein the station is a coordinator station.

5. The method of claim 1, wherein the DSPS messages comprising beacons having power management (PM) mode informational elements (IE) set to ADSM and all stations in the ADSM indicated in a sleep station bitmap field, wherein a station in the ADSM skips beacons for power saving.

6. The method of claim 5, further comprising:
entering the first sub-mode upon the station relinquishing a coordinating function; and
entering the second sub-mode upon at least one station performing the coordinating function and upon detecting no channel activity for a predetermined number of superframes.

7. The method of claim 6, wherein the first sub-mode comprising:
scheduling a wake period;
remaining in an inactive state for the duration of the computed current sleep period;
entering the wake period; and
remaining in the first sub-mode until new channel activity is detected in the wireless network during the wake period, otherwise returning to the inactive state until a next wake period.

8. The method of claim 6, wherein the second sub-mode comprising:
computing a current sleep period for a current sleep window cycle for the second sub-mode based at least partly on one or more previous sleep periods for all stations in the network;
scheduling a periodic wake period by the at least one station performing the coordinating function;
transmitting beacons for setting other stations to the second sub-mode;
remaining in an inactive state by the stations in the second sub-mode until the at least one station performing the coordinating function transmits a wake beacon to the stations in the second sub-mode.

9. The method of claim 8, wherein the stations in the second sub-mode return to an inactive state after the wake period, unless the deep sleep mode is terminated.

10. The method of claim 1, wherein the current sleep period is determined by $$SW_k \begin{cases} \text{initial deep sleep window.} & k = 0 \\ \min\{s^*SW_{k-1}, \text{final deep sleep window}\} & k > 0 \end{cases}$$

where $SW_k$ is the current sleep period for the $k^{th}$ window, k is an integer, s is a positive integer multiplicative factor, and $SW_{k-1}$ is a sleep period determined for a previous sleep period.

11. The method of claim 5, wherein for the first sub-mode, during the wake period channel activity is passively scanned.

12. The method of claim 11, wherein for the first sub-mode, the wake period is periodically entered.

13. The method of claim 1, wherein the uncompressed A/V data comprises wireless high definition (HD) uncompressed A/V data.

14. A method of power saving in a wireless network for transmitting uncompressed audio/video (A/V) data having a coordinator station, the method comprising:

detecting a low or no channel activity in the wireless network by the coordinator station;
adaptively computing a current sleep period for a current sleep window cycle based at least on a maximum allowed sleep period and one or more previous sleep periods;
entering into a deep sleep power saving (DSPS) mode status for the new sleep window, wherein the DSPS mode includes a power-saving inactive state during which the coordinator station does not transmit a beacon, wherein the DSPS mode includes a first sub-mode and a second sub-mode, wherein the first sub-mode comprising a passive DSPS mode (PDSM) and the second sub-mode comprising an active DSPS mode (ADSM), wherein the PDSM comprising:
passively scanning for channel activity for K superframes during a scheduled wake period, wherein the station terminates the PDSM when channel activity is detected, otherwise the station returns to an inactive state, where K comprises an integer; and
the ADSM comprising:
announcing the ADSM to all stations in the wireless network by transmitting DSPS messages indicating DSPS status.

15. The method of claim 14, further comprising:
determining that the coordinator station is the only station m the wireless network; and
passively scanning a channel for an activity without sending beacons.

16. The method of claim 15, further comprising terminating the deep sleep mode when a new channel activity is detected.

17. The method of claim 14, further comprising:
determining that there is one or more other stations in the wireless network; and
wirelessly transmitting a deep sleep mode message indicating the deep sleep mode status to the one or more other stations in the wireless network.

18. The method of claim 17, wherein the deep sleep mode message is carried by a particular information element in a beacon.

19. The method of claim 17, further comprising:
scheduling one or more wake periods for the new sleep window by the coordinator station;
waking up periodically from the inactive state and going into an active state during which the coordinator station monitors a new channel activity in the wireless network; and
wirelessly transmitting a wake message indicating the one or more scheduled wake periods to the one or more other stations by the coordinator station.

20. The method of claim 19, further comprising:
receiving a wake request message from a particular station among the one or more other stations by the coordinator station; and
transmitting a termination message to the particular station by the coordinators station, the termination message indicating a permission to terminate the deep sleep mode and enter an awake mode by the particular station.

21. The method of claim 19, further comprising:
scanning for a new channel activity in the one or more other stations during the one or more scheduled wake periods by the coordinator station;
detecting the new channel activity by the coordinator station; and
terminating the deep sleep mode for at least one of the one or more other stations by the coordinator station.

22. The method of claim 21, wherein detecting the new channel activity comprises receiving a wake request message from the one or more other stations.

23. The method of claim 21, wherein the deep sleep mode is terminated for all of the one or more other stations in a following system wake period.

24. The method of claim 17, further comprising:
scheduling a system wake period at the end of the sleep window by the coordinator station; and
sending out a follow-up beacon during or at the end of the system wake period for indicating either a termination of the deep sleep mode for all stations or a next sleep window duration by the coordinator station.

25. An apparatus for power saving in a wireless network for transmitting uncompressed audio/video (A/V) data, the apparatus comprising:
a processor configured for:
causing the station to enter into a deep sleep power savings (DSPS) mode when a low or no channel activity is detected within a preset duration, wherein the DSPS mode includes one or more periods of inactive state during which the station does not transmit a beacon, wherein the DSPS mode includes a first sub-mode and a second sub-mode, wherein the first sub-mode comprising a passive DSPS mode (PDSM) and the second sub-mode comprising an active DSPS mode (ADSM), and
adaptively computing a current sleep period for a current sleep window cycle using an adaptive sleep period algorithm based at least on a maximum allowed sleep period and one or more previous sleep periods; and
a memory in communication with the processor and configured for storing the computed current sleep period, wherein the PDSM comprising:
passively scanning for channel activity for K superframes during a scheduled wake period, wherein the station terminates the PDSM when channel activity is detected, otherwise the station returns to an inactive state, where K comprises an integer; and
the ADSM comprising:
announcing the ADSM to all stations in the wireless network by transmitting DSPS messages indicating DSPS status.

26. The apparatus of claim 25, wherein the adaptive sleep period is further based on finding a minimum of:
a mathematical function operating on one or more previous sleep periods; and
a maximum allowed sleep period.

27. The apparatus of claim 25, wherein the station is a coordinator in the wireless network.

28. The apparatus of claim 25, wherein the processor is further configured to cause the station to remain in the deep sleep mode for the duration of the current sleep period or until a new channel activity is detected in the wireless network.

29. An apparatus for power saving in a wireless network for transmitting uncompressed audio/video (A/V) data, the apparatus comprising:

a processor configured for:
adaptively computing a current sleep period for a current sleep window cycle based at least on a maximum allowed sleep period and one or more previous sleep periods at least one of the stations, and
causing a coordinator station to enter into a deep sleep power savings (DSPS) mode status for the duration of the current sleep period when a low or no channel activity is detected, wherein the DSPS mode includes a power-saving inactive state during which the coordinator station does not transmit a beacon, wherein the DSPS mode includes a first sub-mode and a second sub-mode, wherein the first sub-mode comprising a passive DSPS mode (PDSM) and the second sub-mode comprising an active DSPS mode (ADSM); and
a memory in data communication with the processor and configured to store the current sleep period, wherein the PDSM comprising:
passively scanning for channel activity for K superframes during a scheduled wake period, wherein the station terminates the PDSM when channel activity is detected, otherwise the station returns to an inactive state, where K comprises an integer; and
the ADSM comprising:
announcing the ADSM to all stations in the wireless network by transmitting DSPS messages indicating DSPS status.

30. The apparatus of claim 29, wherein the processor is further configured to:
determine that the coordinator station is the only station in the wireless network;
passively scan a channel for an activity without sending beacons; and
terminate the deep sleep mode when a new channel activity is detected.

31. The apparatus of claim 29, wherein the processor is further configured to:
determine that there is one or more other stations in the wireless network; and
send a deep sleep mode message indicating the deep sleep mode status to the one or more other stations in the wireless network.

32. The apparatus of claim 31, wherein the processor is further configured to:
schedule a wake period or a system wake period during the deep sleep mode;
cause the coordinator station to wake up periodically from the inactive state and stay active during the wake period or the system wake period to monitor a channel activity; and
terminate the deep sleep mode for the wireless network when the channel activity is detected.

33. The apparatus of claim 31, wherein the coordinator station further comprises a transmitter for transmitting the deep sleep mode message and a receiver for wirelessly receiving a wake request message from the one or other stations.

* * * * *